3 Sheets—Sheet 1.
R. H. W. DUNLOP.
HAND AND FOOT-PLATES FOR SWIMMING.
No. 183,045. Patented Oct. 10, 1876.
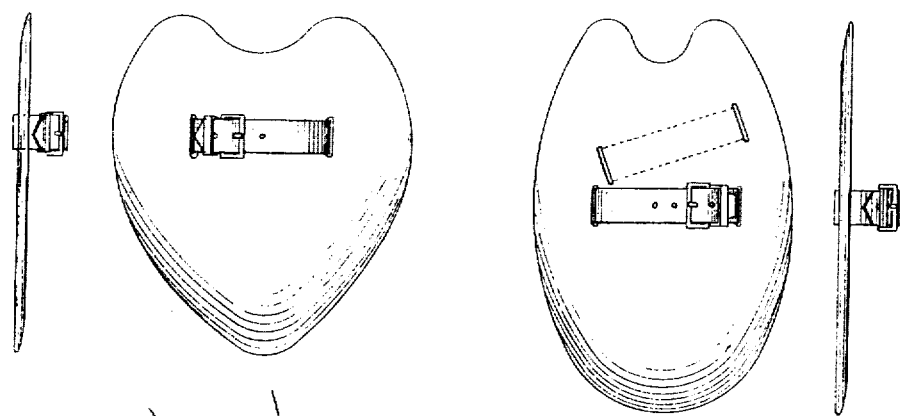
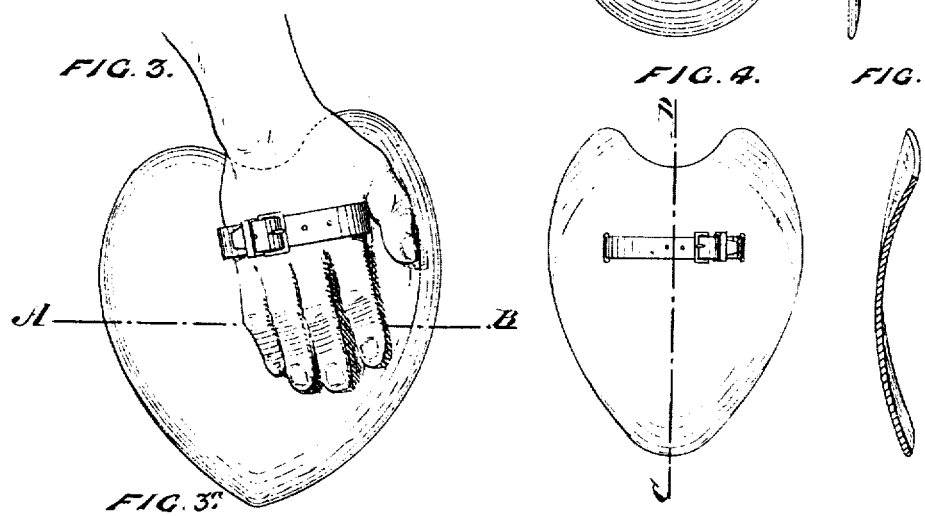
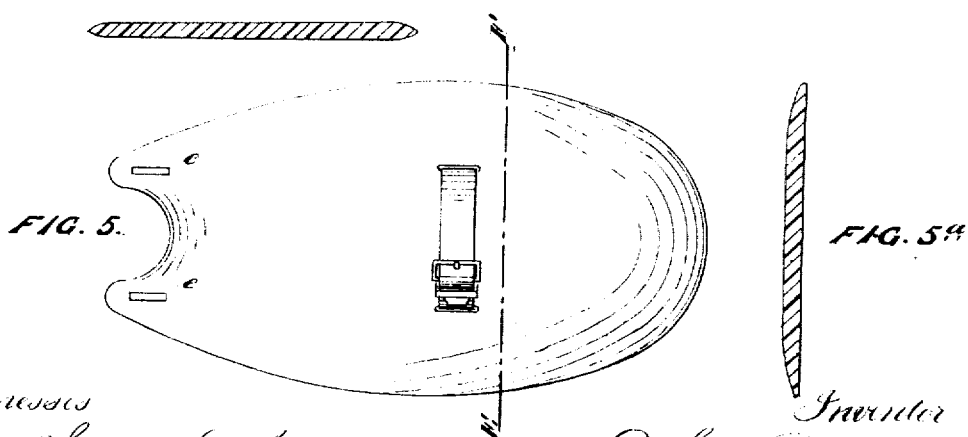
Witnesses
Chas. H. Smith
Geo. T. Pinckney
Inventor
R. H. W. Dunlop
per L. W. Serrell, atty.

3 Sheets—Sheet 2.
R. H. W. DUNLOP.
HAND AND FOOT-PLATES FOR SWIMMING.
No. 183,045. Patented Oct. 10, 1876.
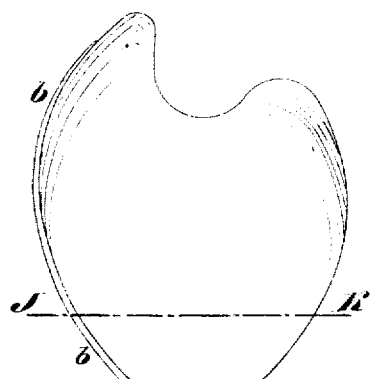
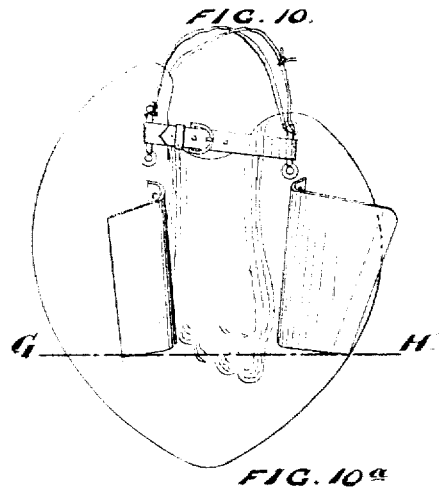
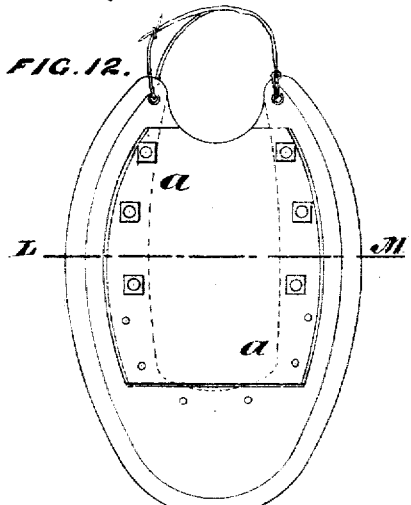
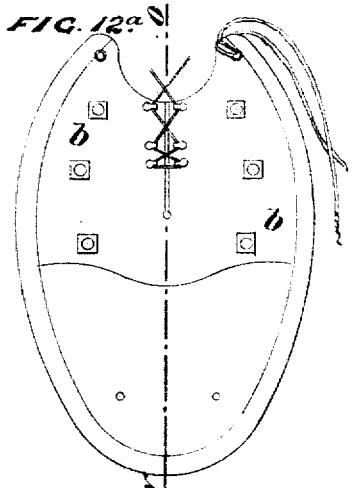
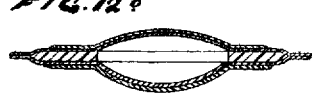
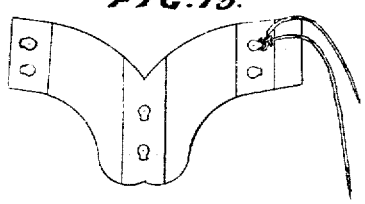
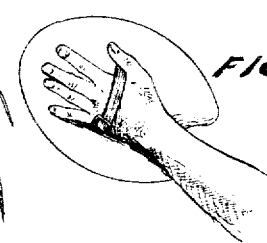
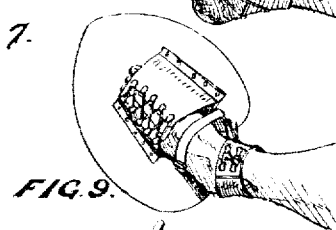
Witnesses
Chas. H. Smith
Geo. T. Pinckney
Inventor
R. H. W. Dunlop
per L. W. Serrell, Atty.

R. H. W. DUNLOP.
HAND AND FOOT-PLATES FOR SWIMMING.

No. 183,045. Patented Oct. 10, 1876.

Witnesses
Chas H Smith
Geo. T. Pinckney

Inventor
R. H. W. Dunlop.
per L. W. Serrell atty

UNITED STATES PATENT OFFICE.

ROBERT H. W. DUNLOP, OF KENT GARDENS, EALING, ENGLAND.

IMPROVEMENT IN HAND AND FOOT PLATES FOR SWIMMING.

Specification forming part of Letters Patent No. 183,045, dated October 10, 1876; application filed June 23, 1876.

*To all whom it may concern:*

Be it known that I, ROBERT HENRY WALLACE DUNLOP, of Kent Gardens, Ealing, in the county of Middlesex, England, C. B., have invented new and useful Improvements in Means or Apparatus for Aiding Human Locomotion in the Water, which improvements are fully set forth in the following specification, reference being had to the accompanying drawings.

I construct the hand-plates with concave or recessed edges where the wrist comes in swimming, and the foot plates or flippers have a similar recess at the portion coming at the hollow of the foot beneath the instep, the object being to equalize the area of resistance around the portion of the plate against which the power of the hand or foot is principally exerted, thereby lessening the leverage upon the hand or foot, and allowing the plates or flippers to be used with great freedom. The edges of the plates are beveled, and the general outlines are heart shape, so that there will be no risk of injury to the person using the same, and the plates are guided and manipulated in the water with greater facility than the paddles heretofore employed.

Having experimented in the subject of apparatus and appliances for swimming and diving for some years, I have so far found that, owing to the complexity of human action in swimming, hinged, jointed, and umbrella-shaped fins or webs—in short, all collapsing appliances—are unmanageable and comparatively worthless, and my present invention does not comprise any such appliances.

Figure 1 of the accompanying drawings is a plan of a cordate hand-plate, and Fig. 1ª is a side view of same. Such a hand-plate of medium size may conveniently be formed of beech, birch, oak, cedar, mahogany, or other strong and even-grained wood. The edges of the upper front and lower rear side are beveled, as shown at Fig. 1ª. There are two slots cut through it about four inches apart, and I pass a buckled strap through it, as shown, and I pass the four fingers and their knuckles through this strap, and thus obtain perfect command of the plates. (See Figs. 6 and 7.)

Fig. 2 is a plan, and Fig. 2ª a side view, of a beaver-tail hand-plate. When the strap shown in dotted lines is used in this one—that is, for the right hand—the appliance becomes a flipper, the pressure being out of the center line.

Fig. 3 is a plan, and Fig. 3ª a cross-section through line A B, of a hand-flipper of a heart shape, and tapering off to one side in thickness, as is seen in Fig. 3ª.

Fig. 4 is a plan, and Fig. 4ª a vertical section through C D, of a cordate hand-plate of sheet-brass or other suitable material "shelled"—that is, following in front and rear the convex curve of a thick plate.

Fig. 5 is a plan, and Fig. 5ª a section through E F, of a large beaver-tail hand-plate for racing, or when extra speed is desired. Slots may be made at *e e* for a subsidiary strap, which also serves for carrying the plate by when the hand is released.

Figs. 6 and 7 show side view and plan—that is, showing maximum and minimum resistance of beaver-tail hand-plates attached to the hand.

Figs. 8 and 9 are also side view and plan or minimum and maximum resistance views of foot-plates attached to the foot.

Fig. 10 is a plan, and Fig. 10ª a cross-section through line G H, of a heart-shaped foot-plate for the right foot fitted with instep-strap, toe-pieces, and double-porpoise lace for the heel. I prefer this shape for foot-plates. The ventricle on the right or outer wing or side is preferably larger than that on the left or inner side, as shown. The bevels, owing to the extra thickness, become varied into curves, leading the plate on the lines it should follow in the turnings from "stroke" to "recovery" and from "recovery" to "stroke," and are suited alike for breast or for back action.

The double-porpoise lace shown at the heel-gap, (also shown at Fig. 12) is used to prevent the plate from slipping off the foot. This lace passes round the tendon Achilles, which is protected by the tail of an anklet, on which are two lace-hooks, as shown in Figs. 8, 9, and 13. This leaves the heel free to move, the lace running easily in the hooks. A strap would not here be so suitable, as it would bind by friction, and thus hinder the free play of the attachment passing round the heel.

Fig. 11 is a plan, showing under side, and

Fig. 11ª a cross-section through J K, of an ordinary cordate foot-plate or flipper for the left foot. It is fitted with a narrow beading, b, of india-rubber or other suitable soft material, along the outer edge, to prevent injury in case of accidentally hitting another swimmer therewith.

Fig. 12 is plan of under side, Fig. 12ª plan of upper side, Fig. 12ᵇ a cross-section through L M', and Fig. 12ᶜ a central section through N O, of a foot-flipper made of canvas india-rubber, mounted on a core of wood or other hard or stiff material, the said core being cut out in the middle, as shown in dotted lines at Fig. 12 and in the sectional views 12ᵇ and 12ᶜ. The india-rubber piece a strengthens the rest or sole for the foot of the swimmer. The part b serves to strengthen the upper or slipper part of the appliance, which is there made open, and to lace on, the lace passing through lace-holes. The india-rubber may also be molded in one single piece onto the core of wood or other hard or stiff material.

Fig. 13 shows an anklet, and Fig. 9 shows it attached to the ankle of the foot.

Fig. 14 shows a fish-tail hand-plate of nitro-cellulose, and Fig. 14ª a section of same.

Fig. 15 shows a blank of nitro-cellulose, from which either foot or hand flippers are made, and Fig. 15ª is a section of same.

Figure 16:
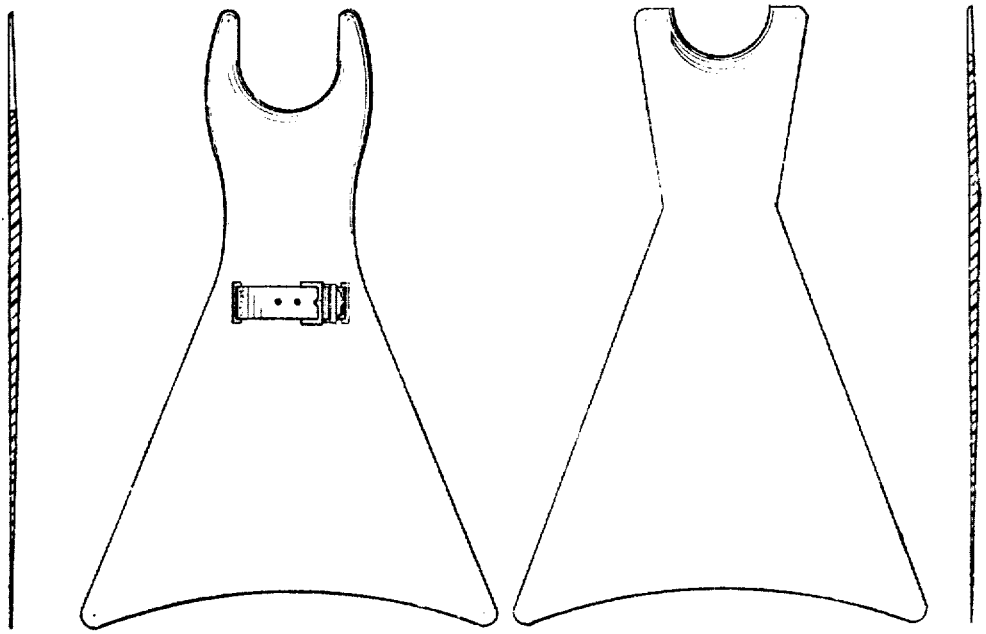

Fig. 16 shows a substitute in sheet-brass, whalebone, and varnished holland, when nitro-cellulose is not procurable.

Figure 17:
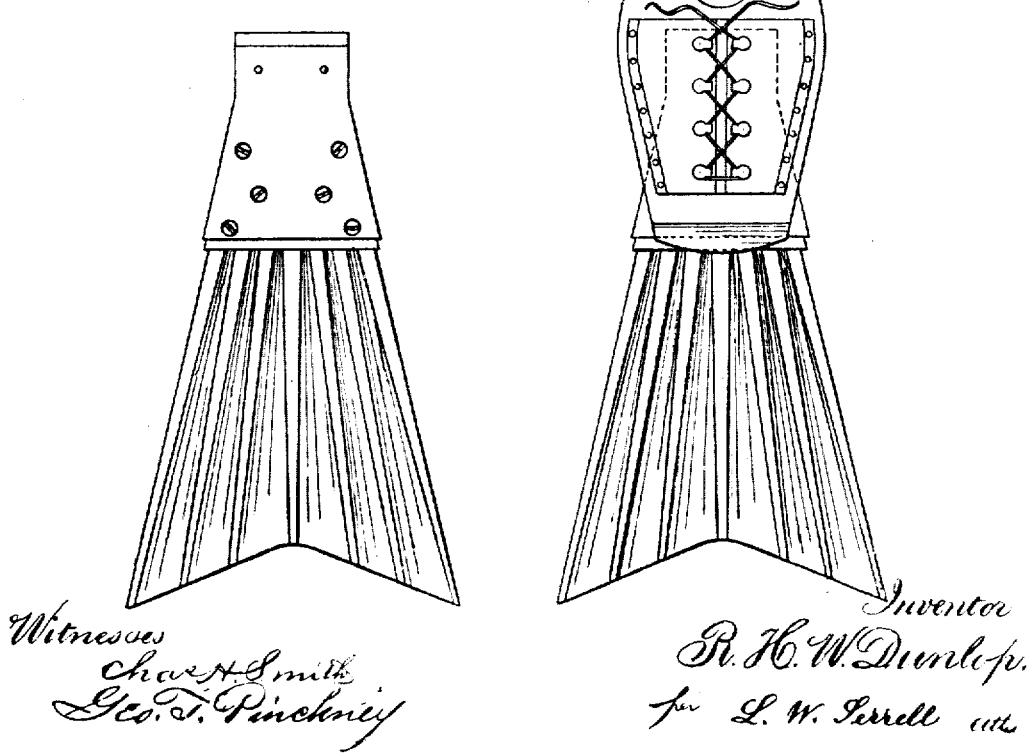

Fig. 17 shows a similar view with foot-plate attachment.

Hand-plates may, in all cases, if desired, be made with alternative central and diagonal slots for use as hand-plates or hand-flippers. With the former no alteration is requisite in changing from breast to back action. In the latter case—that is, with the flipper—more elasticity is obtained, but at the expense of power, and the plates should be reversed in changing from breast to back action.

The angle traversable by the wrist-joint is about one hundred and eighty degrees, and the hereinbefore-described simple attachment gives perfect command of the hand-plate, but, owing to the shorter traverse of the ankle-joint, it becomes necessary to utilize the additional instep-joints, attaching the plates to the fore part of the foot, and leaving the heel free to obtain even ninety degrees of play for the plate. I also scoop out beds for the soles of the feet, and when any deficiency of suppleness exists, I sink the balls of the feet and great toes in the plates, to afford the necessary tilt for presenting plate edgewise to the water during recovery.

I claim as my invention—

1. A swimming-plate of an elliptical or heart shape, with one end recessed, and with the edges beveled, substantially as and for the purposes set forth.

2. A foot plate or flipper for swimming having a recess at one end, and with means for attaching such plate to the foot with the recessed portion at the hollow beneath the instep, substantially as set forth.

R. H. W. DUNLOP.

Witnesses:
 THOS. J. GOODWIN,
37 *Curselor Street, Chancery Lane, London, E. C., Clerk to Henry Charles Coote, of same place, Notary Public.*
 EDWD. LINTOTT,
  *Also Clerk to Mr. Coote.*